US 7,072,935 B2

(12) United States Patent
Kehoe et al.

(10) Patent No.: US 7,072,935 B2
(45) Date of Patent: Jul. 4, 2006

(54) FILTERING WEB PROXY FOR RECORDING WEB-BASED TRANSACTIONS THAT SUPPORTS SECURE HTTP STEPS

(75) Inventors: Jeffrey W. Kehoe, Ft. Collins, CO (US); Robert Lehmann, Bozeman, MT (US)

(73) Assignee: Agilent Technologies, Inc., Palo Alto, CA (US)

( * ) Notice: Subject to any disclaimer, the term of this patent is extended or adjusted under 35 U.S.C. 154(b) by 940 days.

(21) Appl. No.: 09/822,397

(22) Filed: Mar. 30, 2001

(65) Prior Publication Data
US 2002/0035498 A1 Mar. 21, 2002

Related U.S. Application Data

(60) Provisional application No. 60/200,295, filed on Apr. 28, 2000.

(51) Int. Cl.
*G06F 15/16* (2006.01)
(52) U.S. Cl. .............. 709/203; 709/223; 709/224; 709/225; 709/226; 709/229
(58) Field of Classification Search ............ 709/203, 709/224, 227, 238, 249, 251, 252, 223, 225, 709/226, 229
See application file for complete search history.

(56) References Cited

U.S. PATENT DOCUMENTS

| | | | |
|---|---|---|---|
| 5,598,553 A | 1/1997 | Richter et al. | |
| 5,812,668 A | 9/1998 | Weber | |
| 5,938,737 A * | 8/1999 | Smallcomb et al. | 709/247 |
| 5,961,594 A * | 10/1999 | Bouvier et al. | 709/223 |
| 6,006,260 A | 12/1999 | Barrick, Jr. et al. | |
| 6,014,692 A * | 1/2000 | Kelley et al. | 709/217 |
| 6,041,041 A | 3/2000 | Ramanathan et al. | |
| 6,044,398 A | 3/2000 | Marullo et al. | |
| 6,115,742 A * | 9/2000 | Franklin et al. | 709/224 |
| 6,119,167 A * | 9/2000 | Boyle et al. | 709/234 |
| 6,134,583 A * | 10/2000 | Herriot | 709/217 |
| 6,138,157 A * | 10/2000 | Welter et al. | 709/224 |
| 6,151,599 A * | 11/2000 | Shrader et al. | 707/9 |
| 6,157,940 A * | 12/2000 | Marullo et al. | 703/27 |
| 6,195,679 B1 | 2/2001 | Bauersfeld et al. | |
| 6,223,221 B1 | 4/2001 | Kunz | |
| 6,237,035 B1* | 5/2001 | Himmel et al. | 709/224 |
| 6,253,326 B1* | 6/2001 | Lincke et al. | 713/201 |

(Continued)

FOREIGN PATENT DOCUMENTS

WO    WO 99 01819    1/1999

OTHER PUBLICATIONS

Jason I. Hong et al., WebQuilt: A Proxy-based Approach to Remote Web Usability Testing, Jul. 2001, ACM Transactions on Information System, vol. 19, pp 263-285.*

*Primary Examiner*—Ario Etienne
*Assistant Examiner*—Emmanuel Coffy

(57) ABSTRACT

A software product tests and monitors an Internet server system. Advantageously, the software product communicates with a web browser without the need for other client software to configure transactions. The user of the web browser is guided through web pages to record, edit, and playback transactions. Recording may occur over a secure connection. The software product performs automated tests using the transactions in addition to measuring both system performance data and business performance data. The software product generates alarms when thresholds are exceeded. The test data, performance data, and alarms are correlated in time and presented graphically to the user.

20 Claims, 11 Drawing Sheets

U.S. PATENT DOCUMENTS

| | | |
|---|---|---|
| 6,279,002 B1 | 8/2001 | Lenz et al. |
| 6,297,819 B1 * | 10/2001 | Furst .......................... 715/733 |
| 6,314,451 B1 * | 11/2001 | Landsman et al. .......... 709/203 |
| 6,317,761 B1 * | 11/2001 | Landsman et al. .......... 715/513 |
| 6,347,305 B1 * | 2/2002 | Watkins ........................ 705/26 |
| 6,446,120 B1 * | 9/2002 | Dantressangle ............. 709/224 |
| 6,466,967 B1 * | 10/2002 | Landsman et al. .......... 709/203 |
| 6,507,908 B1 * | 1/2003 | Caronni ....................... 713/153 |
| 6,522,995 B1 * | 2/2003 | Conti et al. ................. 702/186 |
| 6,549,944 B1 * | 4/2003 | Weinberg et al. ........... 709/224 |
| 6,553,515 B1 | 4/2003 | Gross et al. |
| 6,560,564 B1 * | 5/2003 | Scarlat et al. ............... 702/186 |
| 6,564,342 B1 | 5/2003 | Landan |
| 6,620,204 B1 * | 9/2003 | Malcolm ..................... 715/513 |
| 6,631,408 B1 * | 10/2003 | Welter et al. ................ 709/223 |
| 6,662,217 B1 * | 12/2003 | Godfrey et al. ............. 709/219 |
| 6,721,686 B1 * | 4/2004 | Malmskog et al. ......... 702/186 |
| 6,754,701 B1 * | 6/2004 | Kessner ....................... 709/219 |
| 6,763,380 B1 | 7/2004 | Mayton et al. |
| 6,829,638 B1 * | 12/2004 | McBrearty et al. ......... 709/219 |
| 6,840,908 B1 * | 1/2005 | Edwards et al. ............. 600/559 |
| 2002/0035498 A1 | 3/2002 | Kehoe et al. |
| 2002/0046363 A1 | 4/2002 | Nelson et al. |
| 2003/0084098 A1 | 5/2003 | Lavin et al. |
| 2004/0003033 A1 | 1/2004 | Kamen et al. |
| 2004/0133635 A1 | 7/2004 | Spriesterbach et al. |

* cited by examiner

WEB BROWSER TOOLBARS

| RECORD | PLAY | STOP | | | | |
|---|---|---|---|---|---|---|

EDIT TRANSACTION

| SAVE | INSERT STEP | DELETE | | HELP | ☐ PLAY WITH PAUSES |
|---|---|---|---|---|---|

TRANSACTION NAME: BOOK PURCHASE

○ STEP 1: [SELECT ITEM]

| PAGE TITLE | PAUSE | URL | MUST HAVE | FAILS WITH |
|---|---|---|---|---|
| ○ BROWSE | 20 | HTTP://WWW.ACME.COM | BOOKS | ERROR |
| ○ REVIEWS | 60 | HTTP://WWW.ACME.COM/BROWSE | TIMES | ERROR |

⊙ STEP 2: [PURCHASE ITEM]

| PAGE TITLE | PAUSE | URL | MUST HAVE | FAILS WITH |
|---|---|---|---|---|
| ○ PURCHASE | 22 | HTTP://WWW.ACME.COM/PURCHASE | SECURE | ERROR |

FIG.7

FILTERING WEB PROXY FOR RECORDING WEB-BASED TRANSACTIONS THAT SUPPORTS SECURE HTTP STEPS

RELATED APPLICATIONS

This application is a non-provisional application based on a provisional application, Ser. No. 60/200,295, filed Apr. 28, 2000.

BACKGROUND OF THE INVENTION

Internet server systems are now a critical component to many successful businesses. Many Internet server systems are configured to function as e-commerce web sites where computer users can purchase goods and services. The efficient and reliable operation of the e-commerce web site is vital to many businesses.

In response to the need for efficient and reliable e-commerce web sites, test systems have been developed to ensure that the web site is operating within tolerable thresholds. These test systems perform automated tests using transactions that were previously recorded. To the web site, the test transaction appears like another customer. These test user transactions are able to determine how long a typical transaction takes and whether or not the e-commerce web site is responding at all.

Unfortunately, current test systems treat the Internet server system that provides the e-commerce web site as a black box—meaning that the test system sends in stimulus and measures response. Test systems do not effectively correlate user test results with internal performance measurements from the Internet server system. If there is a problem, the test system does not effectively isolate the responsible component within the Internet server system.

Current test systems also fail to correlate system testing and performance data with business performance data. Business performance data may only be produced in weekly or monthly reports. If the web site operator receives an alarm from a test system, another system must be used to assess the financial damage due to the system error. The use of multiple systems is complex and time consuming.

For effective testing, the test transactions must be properly configured. As the web site changes, new features and equipment need new test transactions for testing. In a typical sequence to configure a transaction, the user operates a web browser to interact with the web site, and the web browser activity is recorded by a system in between the web browser and the web site. The recorded activity forms the test transaction that is saved for subsequent automated testing.

To put up a web site, the business often uses another entity to provide the web site infrastructure, such as an Internet Service provider (ISP), that owns and operates Internet server systems. The business must interact with the ISP to generate and implement new test transactions. Often, the business receives some client software that it operates with a web browser to generate and implement test transactions through the ISP. Different versions of the client software must be developed for the different web browsers, and possibly for the different versions of the same web browser. Unfortunately, the client software also requires the use of cookies or Java applets that can be too complex for some business users—especially since the ISP is supposed to handle the technical aspects of the web site. Cookies are files that are transferred to the web browser for local storage and use by a web server. Many people dislike storing cookies on their machines.

The cookies and Java applets are required when configuring a transaction to maintain the proper configuration sequence or state. Without proper management, a non-technical user may be easily lost in a transaction configuration sequence. The problem becomes acute when the non-technical user begins to use forward and backward browser commands during a recording session.

Another problem during transaction recording occurs when secure Internet connections are invoked. Secure connections are often used for Internet commerce and need to be tested—especially their effects on transaction time. Configuration tools between the web browser and the web site that record web browser activity must decrypt the web browser activity to record a secure transaction. Thus, the recording component must either have access to the security keys or must be integrated with the web browser. Both of these techniques add too much complexity to the configuration tool.

SUMMARY

The invention is a software product for testing and monitoring an Internet server system. Advantageously, the software product communicates with a web browser without the need for other client software to configure transactions. The user of the web browser is guided through web pages to record, edit, and playback transactions. Recording may occur over a secure connection. The software product performs automated tests using the transactions in addition to measuring both system performance data and business performance data. The software product generates alarms when thresholds are exceeded. The test data, performance data, and alarms are correlated in time and presented graphically to the user.

One aspect of the invention is that it allows users to record the steps of a web-based transaction (e.g. buying a book on the web) using a normal browser by utilizing a filter proxy as a web proxy. The invention allows the filter proxy to see the HTTP request before the secure connection is made. The filter proxy is enabled to record secure requests. Other aspects of this invention include at least: 1) the filter proxy does not have to keep a list of altered secure URLs because the appended string of characters identifies the altered secure URLs; 2) the filter proxy also provides a mechanism to differentiate new page requests from requests for embedded objects; 3) multiple proxies can be instantiated to allow multiple recording sessions; and 4) the filter proxy can provide other filtering of the request and response (e.g. HTTP headers can be filtered).

DESCRIPTION OF THE DRAWINGS

FIG. 7 is a block diagram that illustrates a web browser edit transaction page in an example of the invention.

DETAILED DESCRIPTION OF THE INVENTION

Figure 1:
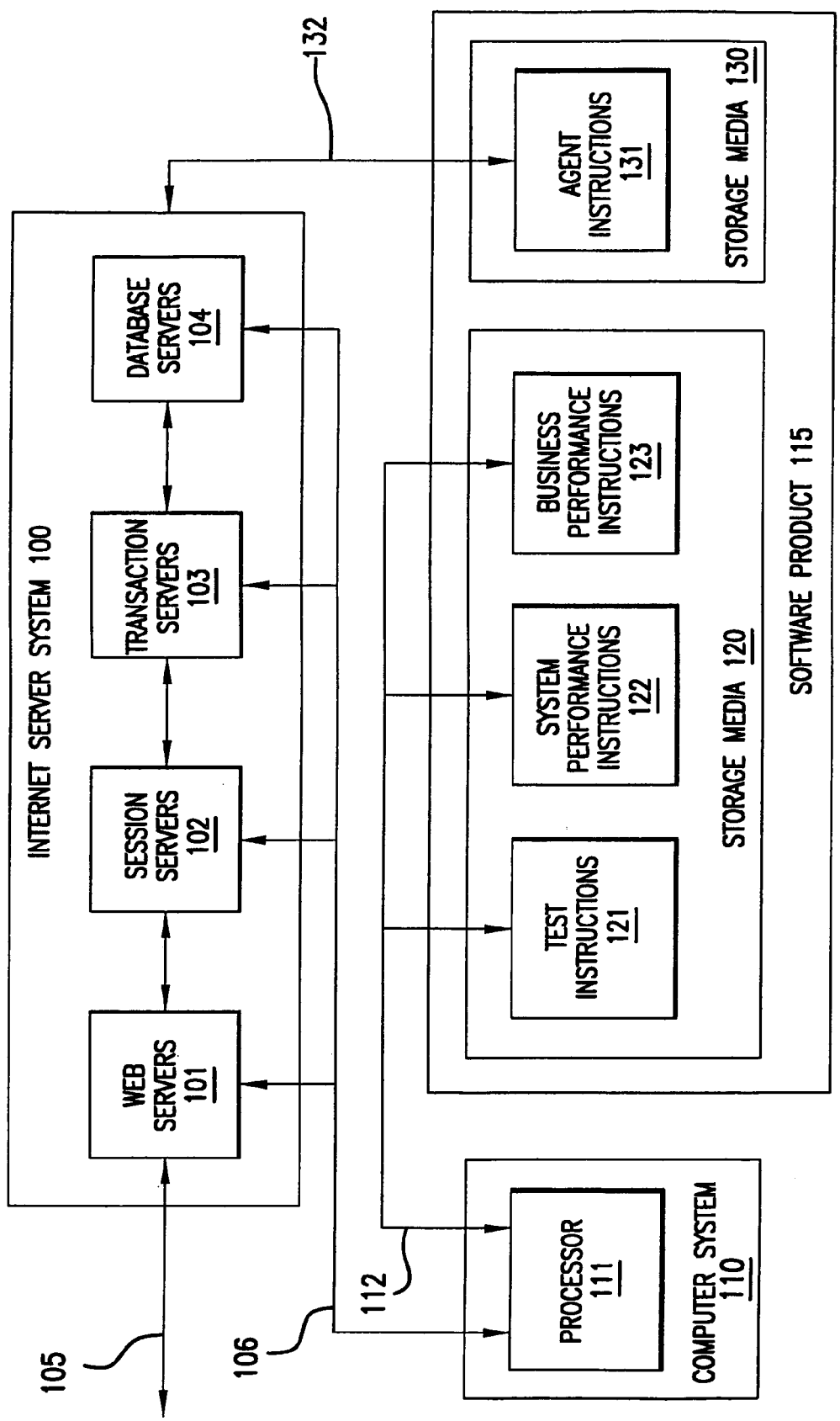
FIG. 1 is a block diagram that illustrates Internet server system testing and monitoring in an example of the invention.
Figure 2:
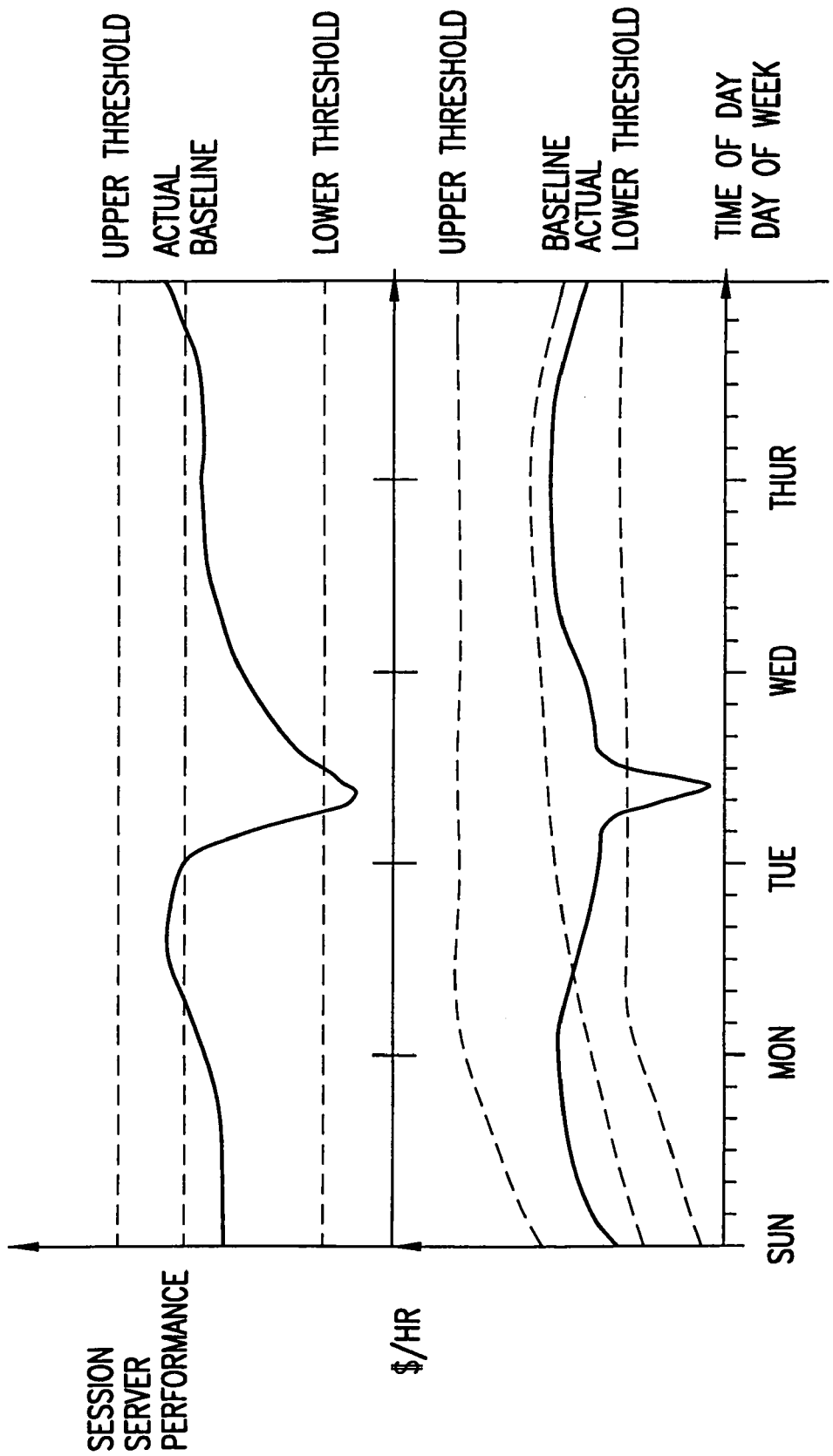
FIG. 2 is a chart diagram that illustrates Internet server system testing and monitoring in an example of the invention.

Internet Server System Testing and Monitoring—FIGS. 1–2

FIGS. 1–2 depict a specific example of Internet server system testing and monitoring in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1–2 have been simplified or omitted for clarity.

FIG. 1 is a block diagram that illustrates Internet server system testing and monitoring in an example of the invention. FIG. 1 includes Internet server system 100 and computer system 110 that have access to software product 115. Internet server system 110 is coupled to Internet connections 105 and includes web servers 101, session servers 102, transaction servers 103, and database servers 104. Web servers 101 use web pages to interact with users over Internet connections 105. Session servers 102 track and respond to individual user activity by selecting web pages with appropriate transaction data. Transaction servers support session servers 102 by exchanging transaction data. Database servers 104 store transaction data.

Computer system 110 includes processor 111 that communicates with each of web servers 101, session servers 102, transaction servers 103, and database servers 104 over link 106. Link 106 could be implemented within Internet connections 105. Computer system 110 tests and monitors Internet server system 100 in response to processor 111 executing the instructions of software product 115.

Software product 115 comprises software storage media 120 and software storage media 130, and if desired, the two storage media could be integrated together. Software storage media 120 includes test instructions 121, system performance instructions 122, and business performance instructions 123. Software storage media 130 includes agent instructions 131. Some examples of software storage media 120 and 130 are memory devices, tape, disks, integrated circuits, and servers. Processor 111 retrieves and executes test instructions 121, system performance instructions 122, and business performance instructions 123 using software access link 112. Internet server system 100 retrieves and executes agent instructions 131 using software access link 132. Those skilled in the art appreciate that software access links 112 and 132 are logical entities that represent various structures for providing software access. For example, software product 115 could be downloaded from a server or transferred from a disk to a local memory device in computer system 110 for subsequent retrieval and execution by processor 111. The instructions 131 are operational when executed by Internet server system 100 to direct Internet server system 100 to operate in accord with the invention. Instructions 121–123 are operational when executed by processor 111 to direct processor 111 to operate in accord with the invention. The term "processor" refers to a single processing device or a group of inter-operational processing devices. Some examples of processor 111 include computers, integrated circuits, and logic circuitry. Those skilled in the art are familiar with instructions, processors, and storage media.

Test instructions 121 direct processor 111 to configure and execute user transaction tests and report user transaction test results. User transaction tests emulate user activity to generate test results such as transaction times and data transfer rates. System performance instructions 122 direct processor 111 to measure system performance data for each of web servers 101, session servers 102, transaction servers 103, and database servers 104. Examples of system performance data include processing capacity and data retrieval time. Business performance instructions 123 direct processor 111 to measure business performance data. Examples of business performance data include: 1) monetary volume transacted by Internet server system 100 during a time period, 2) new orders transacted by Internet server system 100 during a time period, 3) sales volume for an item transacted by Internet server system 100 during a time period, 4) lost sales due to system errors during a time period, and 5) abandoned shopping carts during a time period. Agent instructions 131 direct Internet server system 100 to read its log files to collect and transfer the system performance data and the business performance data to processor 111.

FIG. 2 is a chart diagram that illustrates Internet server system testing and monitoring in an example of the invention. FIG. 2 illustrates a chart that is generated by processor 111 and that could be included in a graphical display or report. The horizontal axis represents time of day and day of week. The vertical axis represents both dollars per hour transacted at Internet server system 100 and the performance of session servers 102 performance. Both are correlated in time along the horizontal axis. Performance could be processing load or some other system performance metric. The solid lines represent actual system performance data and actual dollars per hour performance data. The lines for the actual performance data are bounded by upper and lower thresholds that can be set by the user to trigger alarms. The lines for the actual performance data have corresponding baselines which represent averages for the time of day and day of week that have been previously calculated. From the chart, one can readily deduce that poor session server performance caused a serious loss in dollars per hour on Tuesday morning. Alarms were generated when the actual performance data fell below the lower thresholds. Alarms could trigger phone calls, e-mails and pages to significant personnel who can quickly pull up the chart using a remote terminal.

System performance instructions 122 and business performance instructions 123 direct processor 111 to correlate the system performance data and the business performance data in time. System performance instructions 122 direct processor 111 to process the system performance data to generate system performance averages associated with time of day and day of week. System performance instructions 122 direct processor 111 to process the system performance data to generate system alarms when a system performance threshold associated with time of day and day of week is exceeded. System performance instructions 122 direct processor 111 to process the system performance data to generate system graphics illustrating system performance measured against baselines and thresholds Business performance instructions 123 direct processor 111 to process the business performance data to generate business performance averages associated with time of day and day of week. Business performance instructions 123 direct processor 111 to process the business performance data to generate business alarms when a business performance threshold associated with time of day and day of week is exceeded. Business performance instructions 123 direct processor 111 to process the business performance data to generate business graphics illustrating business performance measured against baselines and thresholds.

Test Instructions and Computer System Operation—FIGS. 3–10

FIGS. 3–10 depict a specific example of test instructions and computer system operation in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3–10 have been simplified or omitted for clarity.

Figure 3:
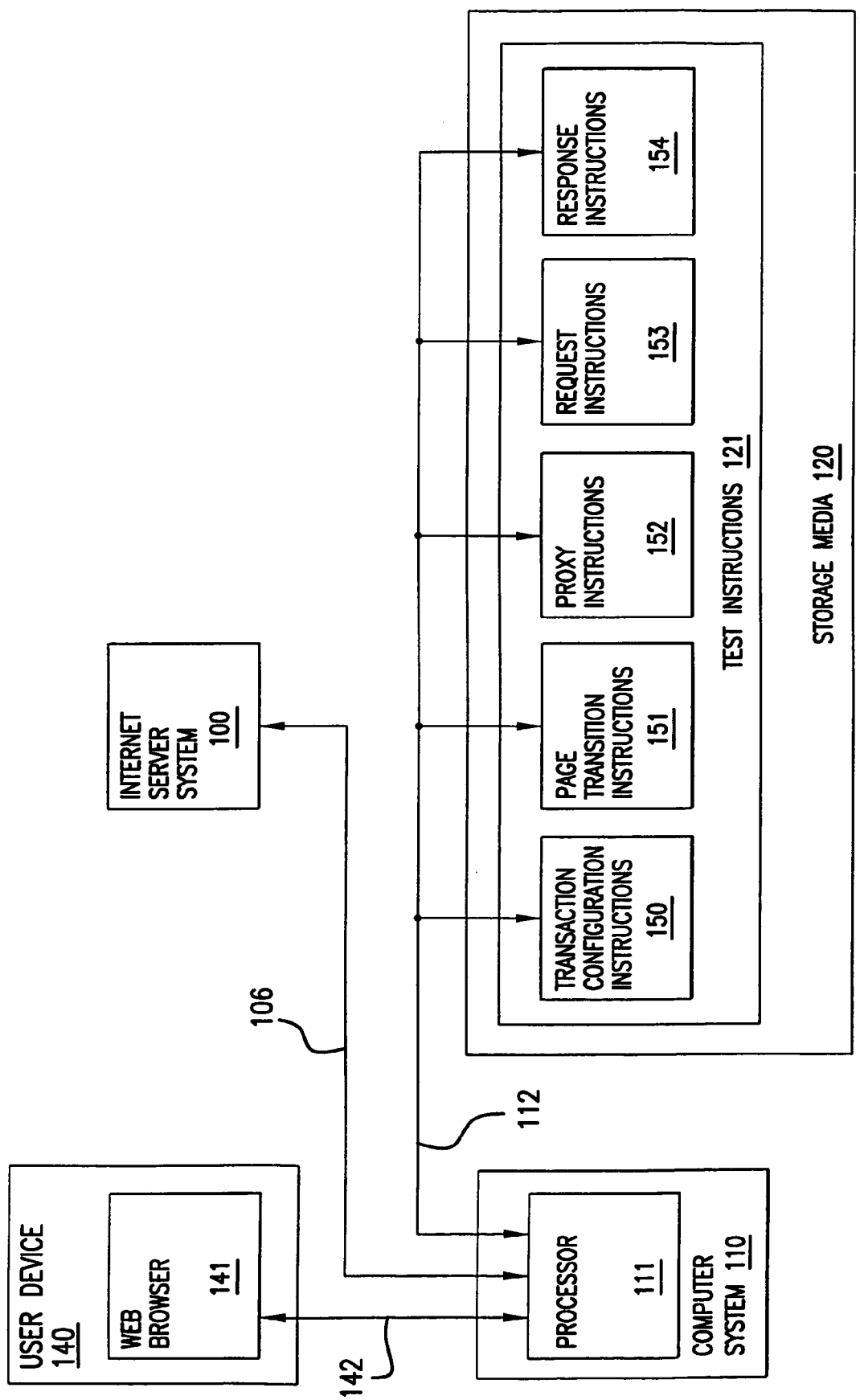
FIG. 3 is a block diagram that illustrates test instructions in an example of the invention.

FIG. 3 is a block diagram that illustrates test instructions 121 in an example of the invention. FIG. 3 also shows user device 140 that allows a user to operate web browser 141 to display web pages and input data. Web browser communicates with processor 111 over link 142. Typically, links 106 and 142 include a firewall to protect computer system 110.

In response to processor 111 executing test instructions 121, computer system 110 operates to configure a transaction for the user operating web browser 141. The transaction is used for automated testing of Internet server system 100. One example of a transaction is a purchase from Internet server system 100. Test instructions 121 include transaction configuration instructions 150, page transition instructions 151, proxy instructions 152, request instructions 153, and response instructions 154. Test instructions 121 direct processor 111 to: 1) interact with web browser 141 and Internet server system 100 to record web browser activity to generate the transaction, 2) edit the transaction, 3) perform an automated test of Internet server system 100 using the transaction to validate the transaction for subsequent automated testing, 4) display test results from the automated test to the user, 5) save the transaction for subsequent automated testing of Internet server system, and 6) periodically perform automated tests of Internet server system 100 using the transaction and report test results. Transaction save operations should not require system restart.

Test instructions 121 may direct processor 111 to interact with web browser 141 and Internet server system 100 through a firewall. Test instructions 121 direct processor 111 to record the web browser activity to generate test measurements, such as the sequence of web pages. Test instructions 121 direct processor 111 to add test measurements, such as transaction time and transaction data transfer rate, to the transaction.

Test instructions 121 can also direct processor 111 to record the browser activity as a series of steps and to edit the transaction to specify test measurements for each step. Examples of test measurements for a step include elapsed time, a required string in an Internet server system response, and a prohibited string in an Internet server system response.

Test instructions 141 may also direct processor 111 to record pauses for the steps and edit the transaction to redefine the pauses.

Test instructions 121 have the following test configuration and performance features. They can handle HTTP frames, cookies, and secure connections. They can parse pages for content and provide notification if content changes are discovered. They can support nested transactions. They can specify ports for use by test performance systems. They can emulate user data input, such as data fills, check boxes, and button clicks. They can handle dynamic transaction updates, and they may be written in Java.

Transaction configuration instructions 150 direct processor 111 to generate and transfer Hypertext Markup Language (HTML) pages without cookies to web browser 141. Advantageously, a standard web browser can be used to remotely configure a complex test transaction without storing cookies or Java applets on user device 140. Transaction configuration instructions 150 direct processor 111 to configure the transaction for automated testing of Internet server system 100 in response to user inputs to the HTML pages. The HTML pages include a user login page, a transaction selection page, a transaction record page, a transaction edit page, and a transaction play page. The pages can be set-up using different languages.

Figure 4:
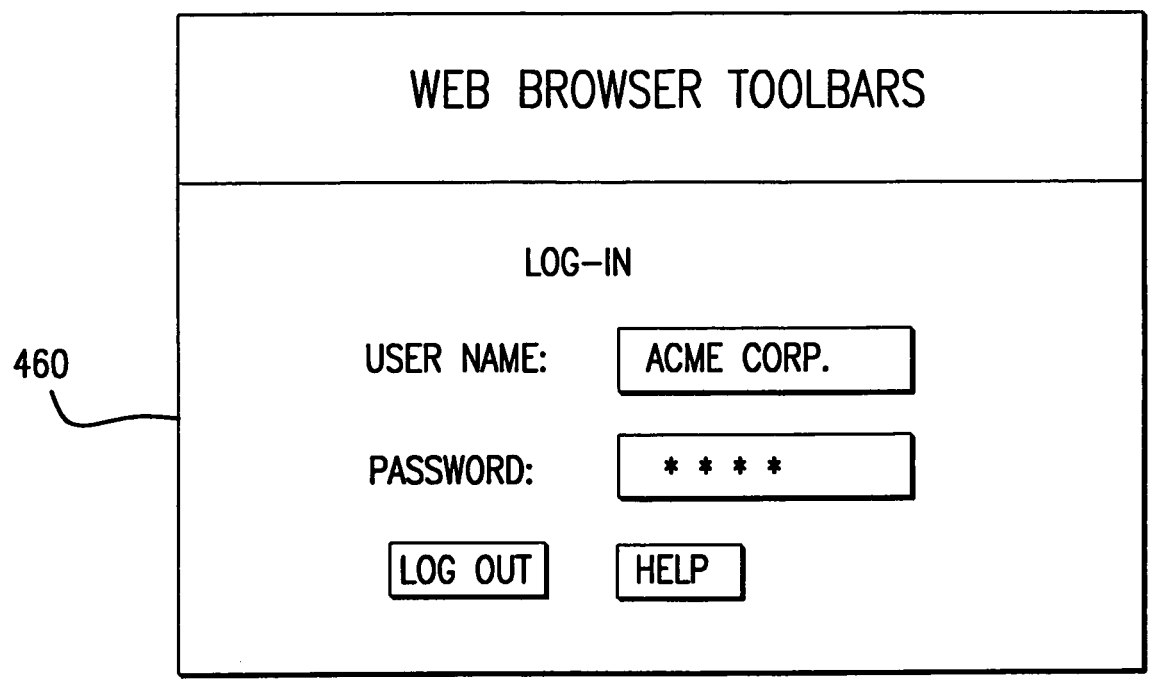
FIG. 4 is a block diagram that illustrates a web browser login page in an example of the invention.

FIG. 4 is a block diagram that illustrates web browser login page 460 in an example of the invention. Page 460 includes data entry boxes for user name and password that is verified by computer system 110 to authorize the user. Page 460 includes logout and help buttons. Address checks may be used to provide additional security.

Figure 5:
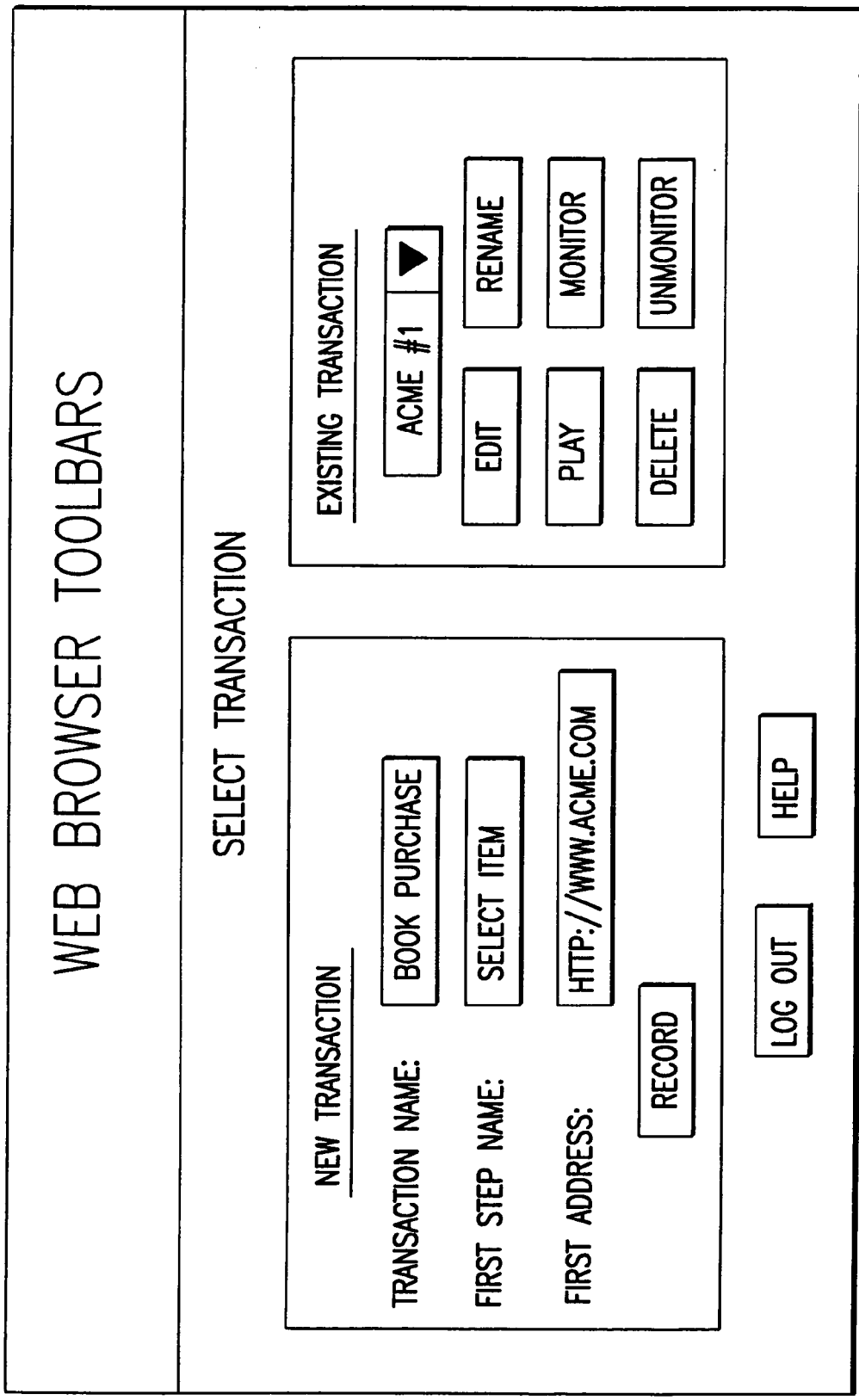
FIG. 5 is a block diagram that illustrates a web browser select transaction page in an example of the invention.

FIG. 5 is a block diagram that illustrates web browser select transaction page 560 in an example of the invention. Page 560 allows the user to use web browser 141 to select a transaction. Page 560 includes new transaction data entry boxes for transaction name, first transaction step name, and a Uniform Resource Locator (URL) for the first transaction step. A record button corresponds to the new transaction data. An existing transaction drop-down selection box corresponds to buttons for edit, play, delete, rename, monitor, and un-monitor. Monitor initiates periodic testing with the transaction, and un-monitor stops periodic testing with the transaction. Page 560 also includes logout and help buttons.

Figure 6:
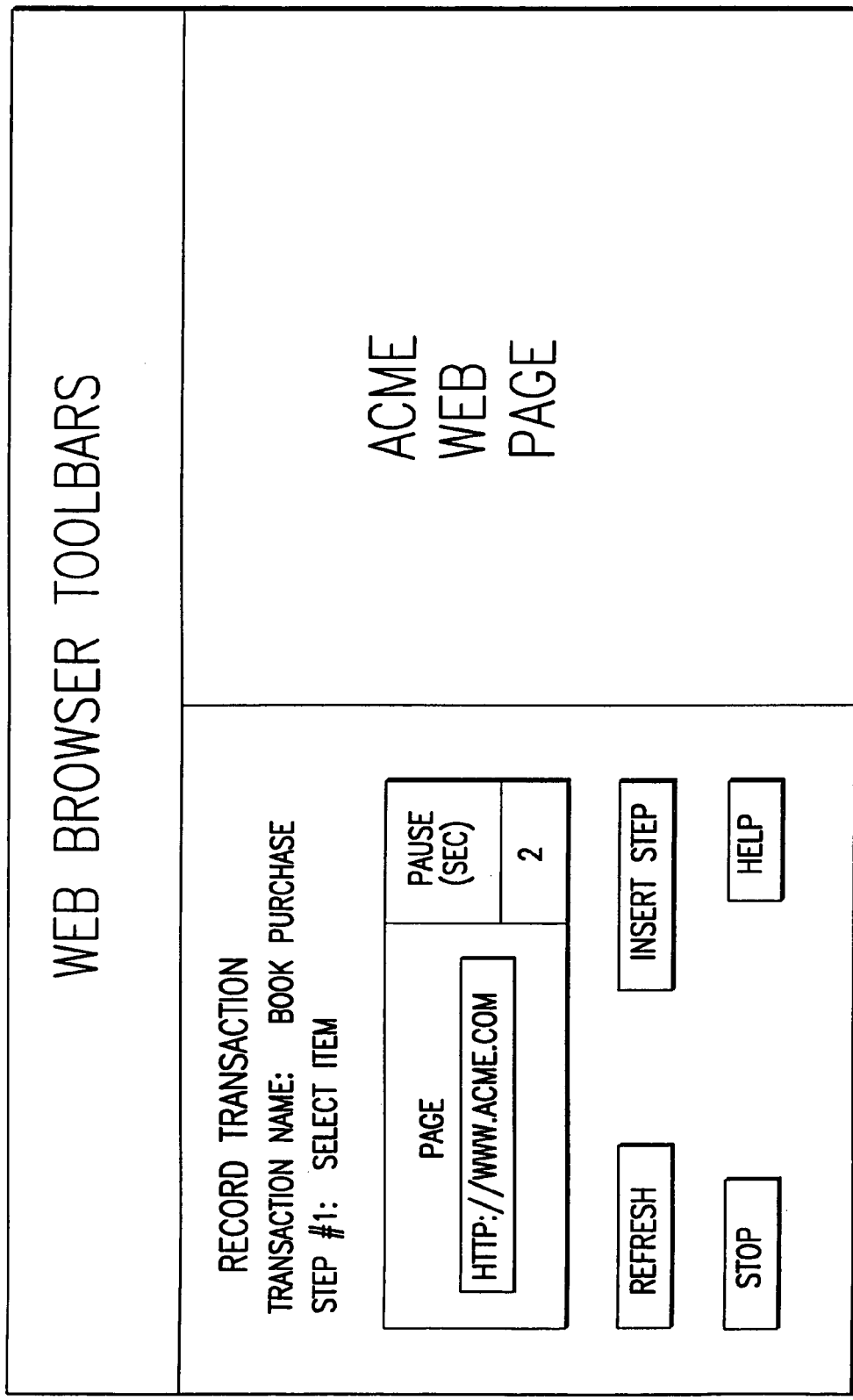
FIG. 6 is a block diagram that illustrates a web browser record transaction page in an example of the invention.

FIG. 6 is a block diagram that illustrates web browser record transaction page 660 in an example of the invention. Page 660 allows the user to use web browser 141 to initiate a recording of web browser activity to generate the transaction. Page 660 identifies the transaction, the transaction step, the URL for the transaction step, and a pause for the URL. Page 660 displays the web page of the URL. Page 660 has buttons for refresh, stop, insert step, and help.

FIG. 7 is a block diagram that illustrates web browser transaction edit page 760 in an example of the invention. Transaction edit page 760 allows the user to use web browser 141 to edit the transaction generated using transaction record page 660. Transaction edit page 760 identifies the transaction and includes data entry boxes for the transaction steps, page titles for each step, URLs for each step, a pause for each URL, and test conditions for each URL. Test conditions include must have strings and fails with strings for each page. Test edit page 760 includes buttons for record, play, stop, save, insert step, delete, and help. A check box for play with pauses is included. If desired, page 760 could allow recorded user data inputs for each step to be viewed and edited.

Figure 8:
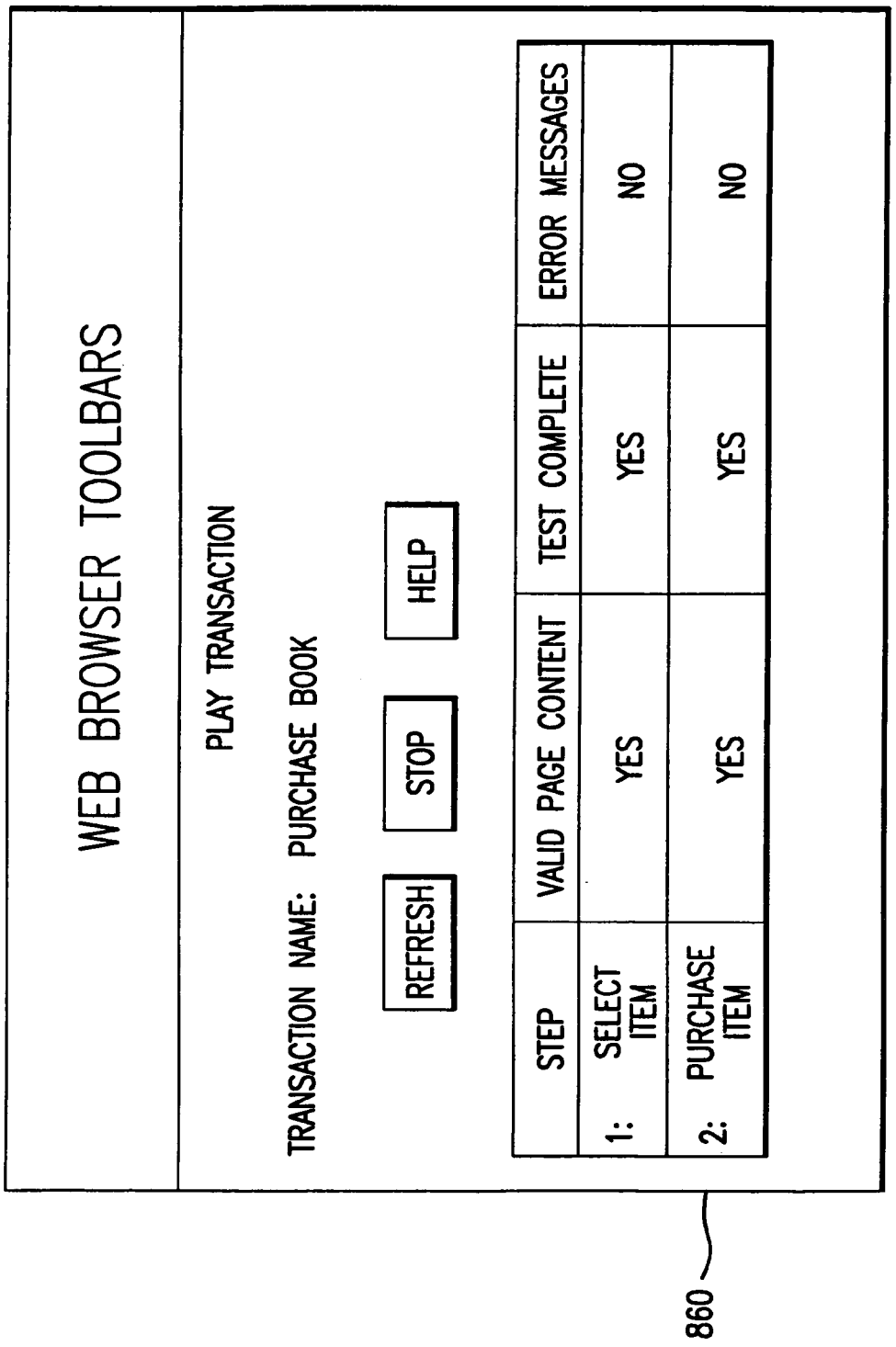
FIG. 8 is a block diagram that illustrates a web browser play transaction page in an example of the invention.

FIG. 8 is a block diagram that illustrates web browser play transaction page 860 in an example of the invention. Transaction play page 860 allows the user to use web browser 141 to view results of an automated test using the transaction generated using transaction record page 660 and edited using transaction edit page 760. Page 860 has buttons for refresh, stop, and help. Transaction play page 860 identifies the transaction, the transaction steps, and test results for each of the transaction steps. Test results include valid page content, test complete, and error messages. Valid page content is determined by searching each page to find must have strings and determining an absence of fails with strings.

Figure 9:
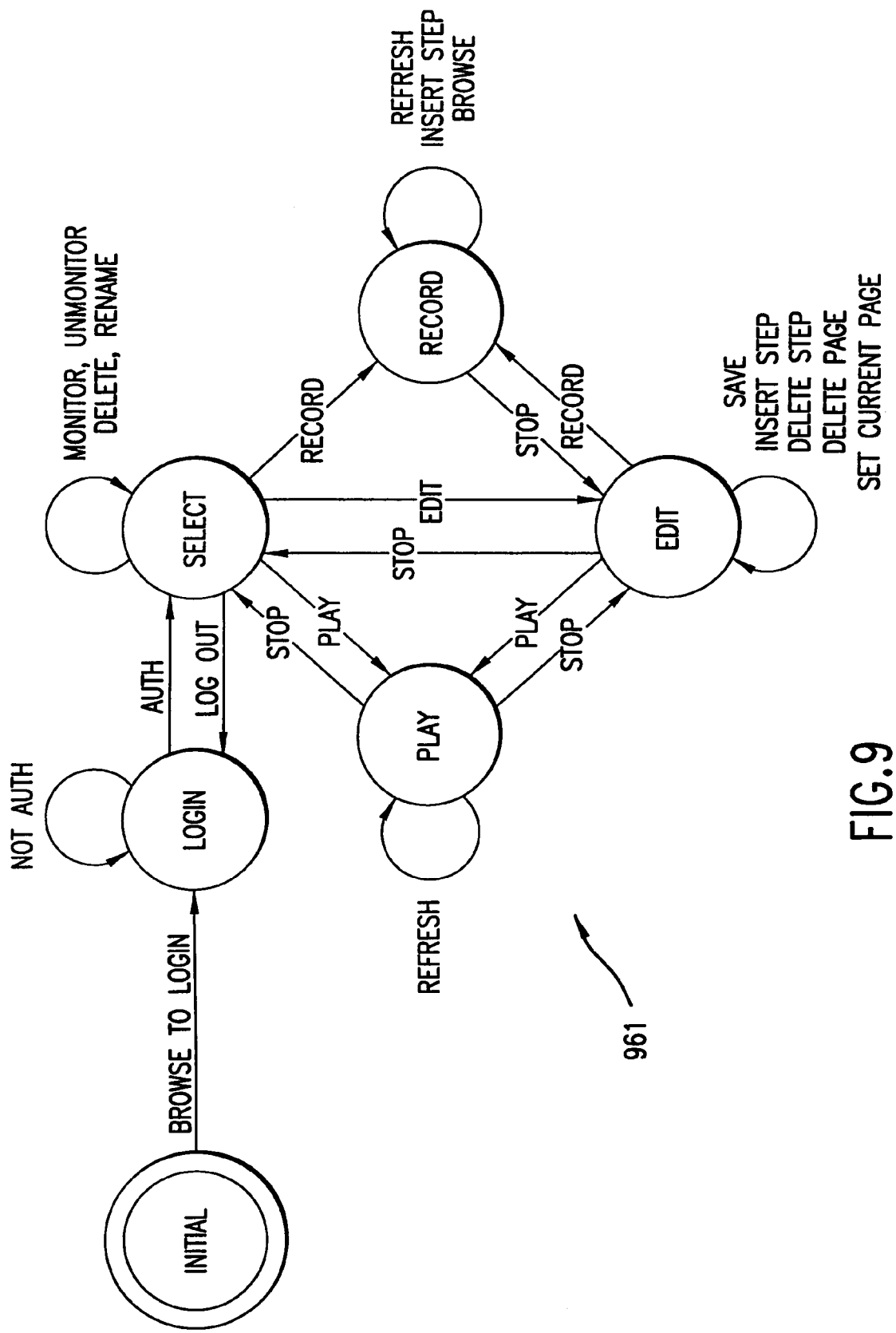
FIG. 9 is a state diagram that illustrates transition state rules for web browser pages in an example of the invention.

FIG. 9 is a state diagram that illustrates transition state rules 961 for web browser page transitions in an example of the invention. Page transition instructions 151 direct processor 111 to transition between the pages in response to the user inputs and to constrain the transition between the pages based on transition state rules 961. Transition state rules 961 constrain the transition between the pages to: 1) transition from transaction selection page 560 to transaction record page 660 in response to a selection page record request, 2) transition from transaction record page 660 to transaction edit page 760 in response to a record page stop request, 3) transition from transaction edit page 760 to transaction play page 860 in response to an edit page play request, 4) transition from transaction play page 860 to transaction edit page 760 in response to a play page stop request. Transition state rules 961 may also constrain the transition between the pages 460–860 to: 1) start at user login page 460 and transition to transaction selection page 560 in response to an authorized login, 2) transition from transaction selection page 560 to transaction edit page 760 in response to a selection page edit request, 3) transition from transaction selection page 560 to transaction play page 860 in response to a selection page play request, 4) transition from transaction edit page 760 to transaction record page 660 in response to an edit page record request, 5) transition from transaction edit page 760 to transaction selection page 560 in response to an edit page stop request, 6) transition from transaction selection page 560 to user login page 460 in response to a selection page stop request, and 7) transition from transaction play page 860 to transaction selection page 560 in response to a play page stop request and the transition from transaction selection page 560 to transaction play page 860.

Figure 10:
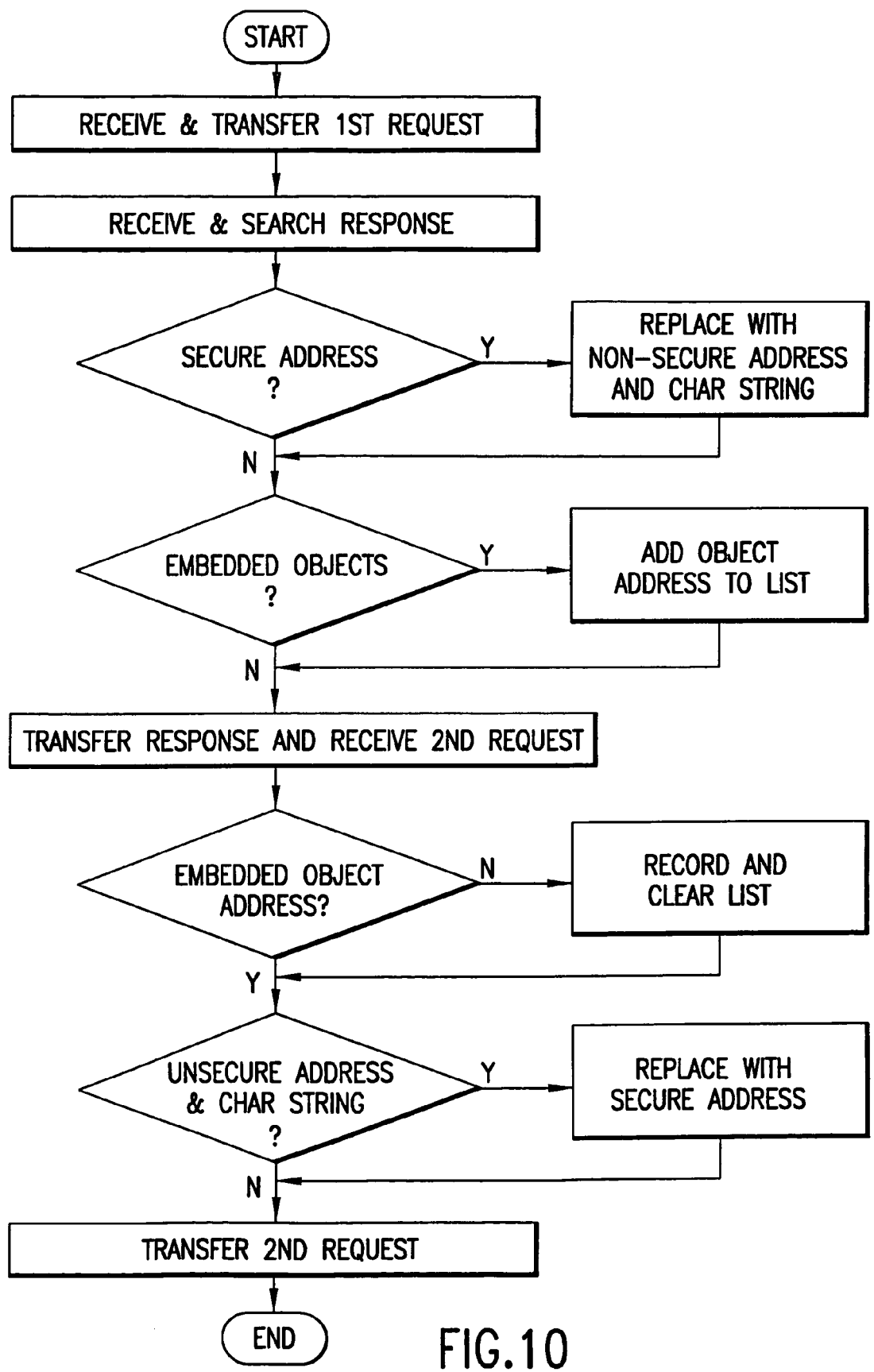
FIG. 10 is a flow diagram that illustrates recording a transaction in an example of the invention.

FIG. 10 is a flow diagram that illustrates computer system 110 operation when recording a transaction. Proxy instructions 152 direct processor 111 to receive a first request from web browser 141, transfer the first request to the Internet, and receive a response to the first request from the Internet. Response instructions 154 direct processor 111 to search the response for a secure address, and if the response includes the secure address, then to replace the secure address with a non-secure address and identifying characters. Response instructions 154 direct processor 111 to search the first response for embedded objects, and if the response includes any embedded objects, then to add corresponding embedded object addresses to a list.

Proxy instructions 152 direct processor 111 to transfer the response to web browser 141 and receive a second request from web browser 141. Request instructions 153 direct processor 111 to record the second request as a new page if the second request is not for any of the embedded object addresses on the list. Request instructions 153 direct processor 111 to clear the list if the second request is not for any of the embedded object addresses on the list. Request instructions 153 direct processor 111 to replace the non-secure address and the identifying characters with the secure address if the second request is for the non-secure address and the identifying characters. Proxy instructions 152 direct processor 111 to transfer the second request to the Internet.

Typically, the requests comprise Hypertext Transfer Protocol requests, the secure address and the non-secure address comprise URLs, and the response comprises a Hypertext Markup Language page. Typically, request instructions 153 direct processor 111 to record: 1) URLs for new page requests, 2) the sequence of the new page requests, 3) elapsed time between new page requests, 4) user input within the new page requests. In some examples of the invention, response instructions 153 direct processor 111 to search a header in the first response for a special instruction, and if the header includes the special instructions, then to record the special instruction.

A system of the invention for testing a web transaction has the ability to test a sequence of web pages, i.e. steps, as part of a transaction. The invention also provides support for nested transactions. For example, the "buy a book" transaction could have nested transactions of "select a book", "add to shopping cart", and check out". Further, each step of a transaction can have one or more web pages associated with it. Each step of a transaction has all of the standard HTTP measurements available to it, e.g. TotalREsponseTime, DnsTime, DataTransferRate, ValidPageContent, etc., as well as the full configuration options of a standard test. HTTP forms may also be filled in (i.e. entering data, selecting check-boxes and/or menu items, clicking on links/buttons, etc.). The invention also allows for page content change notifications which may occur via a content checking mechanism in the HTTP test. The invention also handles dynamic update, thus requiring not restarting of the agent for transaction changes. Finally, the invention also supports simulation of user pauses within a transaction.

A system of the invention for configuring a transaction provides for no programming or scripting. A browser-based interface is used to record a transaction. A proxy will record the transaction. A browser-based interface is used to define/edit transactions. Transaction configuration can be done remotely through firewalls. Transactions can be played back to provide for verification. Editing a transaction does not require a restart of the agent.

Figure 11:
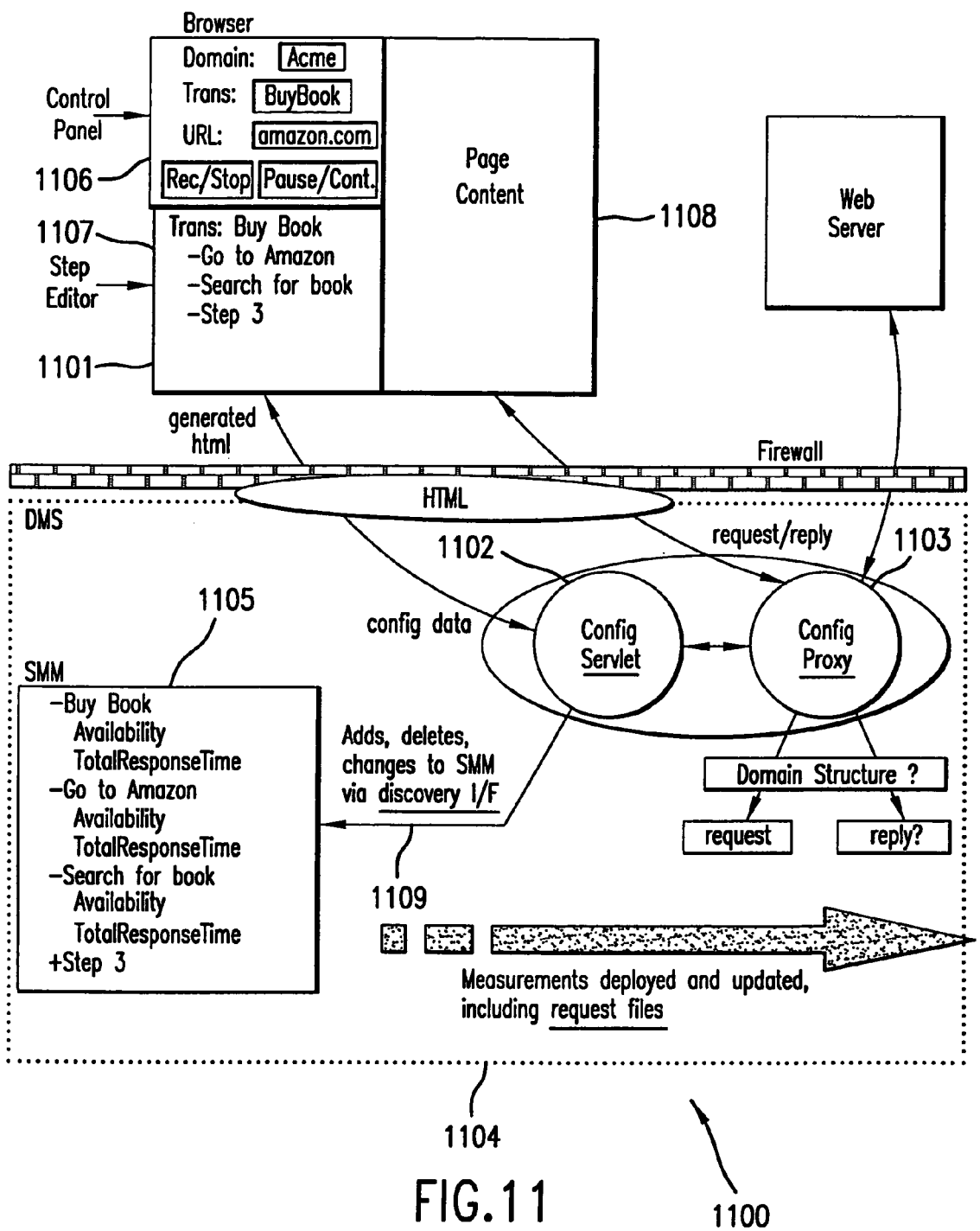
FIG. 11 shows a block diagram of the HTTP transaction test and the associated configuration tool.

FIG. 11 shows a block diagram of the HTTP transaction test and the associated configuration tool. The configuration tool 1100 includes a browser-based configuration tool 1101, a configuration servlet 1102, a configuration proxy 1103 and a DMS 1104 (in particular, the SMM 1005 which is utilized in configuration editing). The configuration tool is a web browser-based interface made up of a control panel 1106 for configuring transactions, a step editor 1107 for editing steps within a transaction and a page content 1108 which displays the interaction with the actual web site being tested.

In a preferred embodiment of the invention, a substantial amount of the processing is performed within the configuration servlet 1102 and the configuration proxy 1103. The configuration servlet 1102 provides the actual HTML-based interaction with the user for the control panel 1106 and step editor 1107 within the configuration tool 1100. In one embodiment of the invention (not shown), the configuration servlet 1102 and the configuration proxy are combined into a single element. FIG. 11 shows the configuration servlet 1102 and the configuration proxy 1103 as separate logical components. Configuration changes are passed to the SMM via the discovery interface 1109. This allows run-time adds, deletes, and changes of transactions and their associated measurements. The transaction edits are then propagated down to the agent via the standard agent configuration path.

Considering the aspects of the invention directed to a filtering web proxy for recording web-based transactions, a user configures a web browser to use the filter proxy as its web proxy with no direct web connections. All web transactions then go through the filter proxy, which records the pages requested. The filter proxy parses the response. When a reference to a secure URL is found (e.g. a redirection, hyperlink, etc.), the filter proxy changes the reference to a non-secure reference. The filter proxy appends an identifying string of characters to the URL. By doing so, the filter proxy does not have to track which URLs have been altered. If a URL is requested that was previously altered by the proxy filter, the filter proxy identifies it by the appended characters and changes it back to a secure request.

Further, the filter proxy has SSL libraries to establish a secure connection to the server and complete the transaction. Since the proxy is parsing the HTML while looking for secure references, it also has the ability to identify embedded objects. Identification of embedded objects allows for differentiation of requests for new pages from embedded objects. The proxy keeps a list of embedded objects. The objects can be kept in any type of file or list. When the proxy receives a request, it checks the list for the requested URL is in the list, it is an embedded object and not a request for a new page that should be recorded. It is not in the list, the requests for a new page. The URL is then recorded and the list is cleared.

As a result, the invention is not limited to the specific examples and illustrations discussed above, but only by the following claims and their equivalents.

What is claimed is:

1. A software product implemented on a computer readable medium for a computer system to record a transaction for a user operating a web browser wherein the transaction is used for automated testing of an Internet server system, the software product comprising:
   proxy instructions configured to direct a processor to receive a first request from the web browser, transfer the first request to the Internet, receive a response to the first request from the Internet, transfer the response to the web browser, receive a second request from the web browser, and transfer the second request to the Internet;
   response instructions configured to direct the processor to search the response for a secure address and if the response includes the secure address then replace the secure address with a non-secure address and identifying characters;
   request instructions configured to direct the processor to record the second request as a new page if the second request is for a new page and to replace the non-secure address and the identifying characters with the secure address if the second request is for the non-secure address and the identifying characters; and a storage medium configured to store the proxy instructions, the response instructions, and the request instructions.

2. The software product of claim 1 wherein:
   the response instructions are further configured to direct the processor to search the response for embedded objects and if the response includes any of the embedded objects then to add corresponding embedded object addresses to a list; and
   the request instructions are further configured to direct the processor to record the second request as a new page if the second request is not for any of the embedded object addresses on the list.

3. The software product of claim 2 wherein the request instructions are further configured to direct the processor to clear the list if the second request is not for any of the embedded object addresses on the list.

4. The software product of claim 1 wherein the request instructions are further configured to direct the processor to record Uniform Resource Locators for the first request and the second request.

5. The software product of claim 1 wherein the request instructions are further configured to direct the processor to record a sequence of the first request and the second request.

6. The software product of claim 1 wherein the request instructions are further configured to direct the processor to record an elapsed time between the first request and the second request.

7. The software product of claim 1 wherein the request instructions are further configured to direct the processor to record user input within the first request and the second request.

8. The software product of claim 1 wherein the transaction is a purchase from the Internet server system.

9. The software product of claim 1 wherein the first request and the second request comprise Hypertext Transfer Protocol requests, the secure address and the non-secure address comprise Uniform Resource Locators, and the response comprises a Hypertext Markup Language page.

10. The software product of claim 1 wherein the response instructions are further configured to direct the processor to search a header in the response for a special instruction and if the header includes the special instruction then to record the special instruction.

11. A method of operating a computer system to record a transaction for a user operating a web browser wherein the transaction is used for automated testing of an Internet server system, the method comprising the steps of:
   receiving a first request from the web browser and transferring the first request to the Internet;
   receiving a response to the first request from the Internet and searching the response for a secure address;
   if the response includes the secure address, then replacing the secure address with a non-secure address and identifying characters;
   transferring the response to the web browser and receiving a second request from the web browser;
   if the second request is for a new page, then recording the second request as a new page;
   if the second request is for the non-secure address and the identifying characters, then replacing the non-secure address and the identifying characters with the secure address; and
   transferring the second request to the Internet.

12. The method of claim 11 further comprising the steps of:
   searching the response for embedded objects, and if the response includes any of the embedded objects, then adding corresponding embedded object addresses to a list; and wherein
   recording the second request if the second request is for a new page comprises recording the second request if the second request is not for any of the embedded object addresses on the list.

13. The method of claim 12 further comprising the step of:
   clearing the list if the second request is not for any of the embedded object addresses on the list.

14. The method of claim 11 further comprising the step of:
   recording Uniform Resource Locators for the first request and the second request.

15. The method of claim 11 further comprising the step of:

recording a sequence of the first request and the second request.

16. The method of claim 11 further comprising the step of:
recording an elapsed time between the first request and the second request.

17. The method of claim 11 further comprising the step of:
recording user input within the first request and the second request.

18. The method of claim 11 wherein the transaction is a purchase from the Internet server system.

19. The method of claim 11 wherein the first request and the second request comprise Hypertext Transfer Protocol requests, the secure address and the non-secure address comprise Uniform Resource Locators, and the response comprises a Hypertext Markup Language page.

20. The method of claim 11 further comprising the step of:
searching a header in the response for a special instruction, and if the header includes the special instruction, then recording the special instruction.

* * * * *